D. G. LITTLEFIELD.

Attaching Covers to Stoves, Tea Kettles, &c.

No. 4,006.

Reissued May 31, 1870.

N. PETERS, Photo-Lithographer, Washington, D. C.

UNITED STATES PATENT OFFICE.

DENNIS G. LITTLEFIELD, OF ALBANY, NEW YORK.

IMPROVEMENT IN COVERS FOR STOVES.

Specification forming part of Letters Patent No. 53,251, dated March 13, 1866; reissue No. 4,006, dated May 31, 1870.

*To all whom it may concern:*

Be it known that I, DENNIS G. LITTLEFIELD, of Albany, in the county of Albany and State of New York, have invented a new and useful Improvement in the Mode of Hinging Covers to Stoves, Tea-Kettles, and other open-topped vessels; and I do hereby declare that the following is a full, clear, and exact description of my invention, reference being had to the accompanying drawing, making part of this specification, of which—

Figure 1:
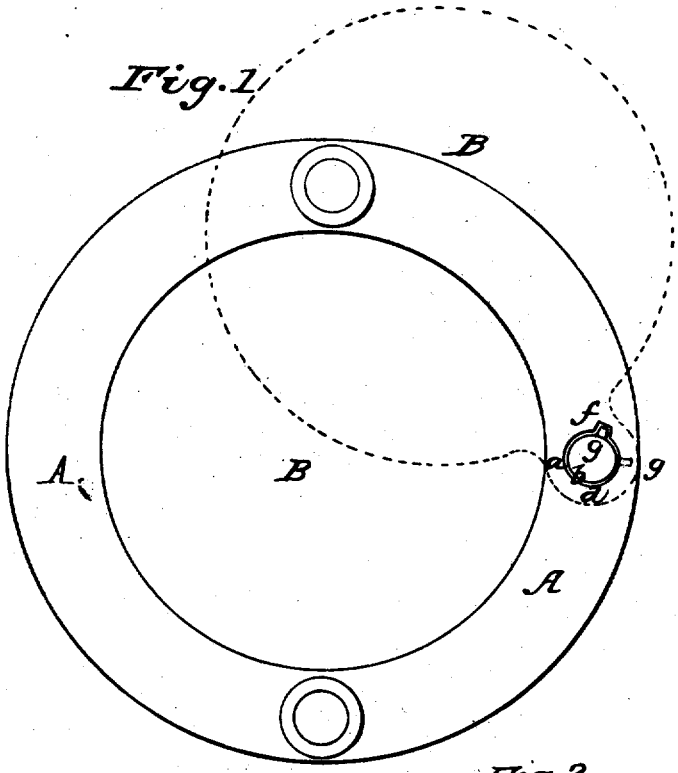
Figure 2:
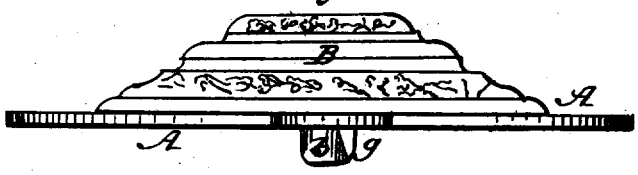
Figure 3:
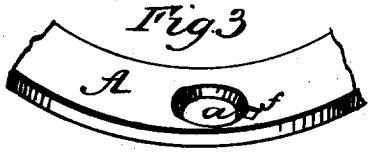
Figure 4:
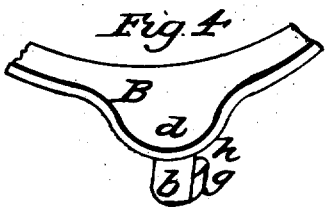

Figure 1 is a plan view of the under side of an annular cast-iron plate designed as a portion of the top piece of a stove, with a cover attached thereto by means of my improved hinge; Fig. 2, a side elevation of the same. Figs. 3 and 4 are views in perspective of detached portions of the top and cover, respectively, embracing the pivot and pivot-aperture forming my improved hinge.

In covering stoves, tea-kettles, and other vessels opening upwardly, it has long been found useful and advantageous to so adjust the cover to the vessel that the former may be swung aside in a horizontal plane without its falling off, and so connected to its seat that it may be readily detached from it.

Some years ago I designed and applied to the covers of a stove-oven, which opened upwardly, a hinge of novel construction, by which the objections to a permanent fastening were, in a measure, obviated. Said device consisted in placing an oval-shaped pivot-pin upon the under side of the cover near its edge, which fitted into an oval-shaped aperture in the rim or upper plate of the stove; a recess or notch cut upon a narrow side of the oval pivot, deep and wide enough to embrace the thickness of the stove-plate, permitted the cover to be swung open horizontally and supported in all those positions in which there was not a coincidence of the larger axis of the pivot with the oval aperture. This mode of hinging the cover to its seat was defective, in that it made an extremely loose joint, and permitted a detachment of the cover at two distinct points, thereby permitting it to fall off on being swung half round.

The object of my present invention is to improve upon the hinge then constructed, and to obtain a hinge for the cover of open-top stoves, tea-kettles, and other vessels, which shall work closely and evenly, and be so formed that the cover may be readily swung open, and avoid all possibility of its falling from the vessel by its own weight when so swung aside; and which can also be removed, when desirable to do so, without trouble or inconvenience.

This invention relates to hinging and securing covers upon open-topped vessels, and consists in forming with a cover and its seat, respectively, a circular opening and a cylindrical pin so constructed that they will engage or lock with each other.

My invention, as represented in the drawing, may be described as follows: The plate or rim A has a circular opening, *a*, and the cover B has fitted to or cast with it a cylindrical pin, *b*, or vice versa. The opening *a* is so formed that when the cylindrical pin is introduced therein, the two engage or lock with each other, and form a hinge-joint, the pin fitting closely and flush in the aperture at all times, whether the cover is at a state of rest or being turned. The close and accurate manner in which the cylindrical pin is embraced within the circular aperture prevents at the same time all loose play or movement thereof. Thus, while the cover B, as with the former hinge, has an easy horizontal movement, it cannot, owing to the cylindrical form of the pivot-pin and the circular form of the aperture, become accidentally detached when swung open; although the cover, as with the former hinge, may be as readily lifted off as if there were no hinge attached to it. Hence, no inconvenience can arise from the employment of my present improvement, and it presents the advantage of creating but little expense in its construction, its parts being cast with the plates proper.

What I claim as my invention, and desire to secure by Letters Patent, is—

A detachable cover and its seat, respectively provided with a pin and an opening, so constructed as to engage or lock with each other, for the purpose of hinging and securing a cover upon an open-topped vessel, substantially as described.

DENNIS G. LITTLEFIELD.

Witnesses:

HENRY C. LITTLEFIELD,
CHAS. S. COLLINS.